US012124577B2

(12) United States Patent
Karpovsky et al.

(10) Patent No.: US 12,124,577 B2
(45) Date of Patent: Oct. 22, 2024

(54) DETECTING MALICIOUS QUERIES USING SYNTAX METRICS

(71) Applicant: Microsoft Technology Licensing, LLC, Redmond, WA (US)

(72) Inventors: Andrey Karpovsky, Kiryat Motzkin (IL); Michael Makhlevich, Sderot (IL); Tomer Rotstein, Haifa (IL)

(*) Notice: Subject to any disclaimer, the term of this patent is extended or adjusted under 35 U.S.C. 154(b) by 253 days.

(21) Appl. No.: 17/565,155

(22) Filed: Dec. 29, 2021

(65) Prior Publication Data

US 2023/0205882 A1 Jun. 29, 2023

(51) Int. Cl.
*G06F 21/56* (2013.01)
*G06F 21/62* (2013.01)

(52) U.S. Cl.
CPC ........ *G06F 21/566* (2013.01); *G06F 21/6227* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,010,522 B2 | 8/2011 | Dewey | |
| 8,225,402 B1* | 7/2012 | Averbuch | H04L 63/14 726/22 |
| 11,354,306 B2* | 6/2022 | Wilding | G06F 11/30 |
| 11,824,894 B2* | 11/2023 | Simioni | G06F 21/6254 |
| 2007/0192474 A1 | 8/2007 | Decasper et al. | |
| 2009/0119777 A1* | 5/2009 | Jeon | G06F 21/577 726/25 |
| 2009/0150374 A1* | 6/2009 | Dewey | G06F 21/562 707/999.005 |
| 2015/0156209 A1 | 6/2015 | Heart | |
| 2017/0220798 A1* | 8/2017 | Madou | G06F 21/552 |
| 2018/0278647 A1 | 9/2018 | Gabaev | |
| 2019/0297056 A1 | 9/2019 | Chiang | |
| 2020/0097587 A1 | 3/2020 | Klein | |
| 2020/0404007 A1* | 12/2020 | Singh | G06F 16/24537 |

(Continued)

FOREIGN PATENT DOCUMENTS

| | | |
|---|---|---|
| CN | 110427754 A | 11/2019 |
| WO | 2014152079 A1 | 9/2014 |

OTHER PUBLICATIONS

"International Search Report and Written Opinion Issued in PCT Application No. PCT/US22/052188", Mailed Date: Apr. 5, 2023, 11 Pages (MS# 410905-WO-PCT).

(Continued)

*Primary Examiner* — Trang T Doan
(74) *Attorney, Agent, or Firm* — Workman Nydegger

(57) ABSTRACT

The detection and alerting on malicious queries that are directed towards a data store. The detection is done by using syntax metrics of the query. This can be done without evaluating (or at least without retaining) the unmasked query. In order to detect a potentially malicious query, syntax metric(s) of that query are accessed. The syntax metric(s) are then fed into a model that is configured to predict maliciousness of the query based on the one or more syntax metrics. The output of the model then represents a prediction of maliciousness of the query. Based on the output of the model representing the predicted maliciousness, a computing entity associated with the data store is then alerted.

20 Claims, 6 Drawing Sheets

(56) References Cited

U.S. PATENT DOCUMENTS

| | | | |
|---|---|---|---|
| 2021/0203676 A1 | 7/2021 | Pendse | |
| 2021/0357409 A1* | 11/2021 | Rodriguez | G06F 16/24553 |
| 2022/0004630 A1* | 1/2022 | Almukaynizi | G06F 21/57 |
| 2022/0166795 A1* | 5/2022 | Simioni | G06F 21/552 |
| 2023/0224323 A1 | 7/2023 | Makhlevich et al. | |

OTHER PUBLICATIONS

Buehrer, et al., "Using parse tree validation to prevent SQL injection attacks", In Proceedings of the 5th international workshop on Software engineering and middleware, Sep. 5, 2005, pp. 106-113.

"Invitation to Pay Additional Fees Issued in PCT Application No. PCT/US22/052487", Mailed Date: Apr. 28, 2023, 8 Pages. (MS# 410956-WO-PCT).

U.S. Appl. No. 17/572,460, filed Jan. 10, 2022.

"International Search Report and Written Opinion Issued in PCT Application No. PCT/US22/052487", Mailed Date: Jun. 20, 2023, 15 Pages. (MS# 410956-WO-PCT).

Non-Final Office Action mailed on Jul. 18, 2024, in U.S. Appl. No. 17/572,460, 29 pages.

\* cited by examiner

DETECTING MALICIOUS QUERIES USING SYNTAX METRICS

BACKGROUND

Some programming languages are used to perform operations on data stores, such as databases. Such programming languages are often termed a "query language". The query engines that operate as the front end of data stores recognize particular query languages. Accordingly, when the data store receives a query that is structured in accordance with a recognized query language, the data store will process the query accordingly. A common query language is Structured Query Language (or "SQL"). SQL queries may be used in particular to interface with relational databases. SQL can be used to modify database tables and index structures; add, update, or delete rows of data; retrieve subsets of information within the database, and so forth.

Sometimes, malicious queries can be attempted against a data store. This takes advantage of the fact that the front end is already authenticated with the data store, and that the front end communicates with the back end in a way that is not visible to the user/attacker. Such inappropriate operations may include maliciously manipulating data or structures, unauthorized accessing of data, running code or manipulating objections within the operating system itself (thus attacking the whole system), and so forth. Perpetrators of malicious queries develop increasing advanced attack methods. Detecting such attempts is challenging due to the dynamic nature of the attacks, and the attackers ingenuity. Detecting such attempts typically involves evaluating the query itself.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the detection and alerting on malicious queries that are directed towards a data store. Furthermore, this detection is done by using syntax metrics of the query. This can be done without evaluating (or at least without retaining) the unmasked query. Accordingly, privacy of the query content itself is preserved. The evaluation and detection of malicious queries can be performed under very strict privacy and performance constraints.

In order to detect a potentially malicious query, one or more syntax metrics of that query are accessed. As an example, such syntax metrics could include a complexity measure of the query, data generated from the compilation or interpretation of the query, string entropy of the query, and/or so forth. The one or more syntax metrics are then fed into a model that is configured to predict maliciousness of the query based on the one or more syntax metrics. The output of the model then represents a prediction of maliciousness of the query. Based on the output of the model representing the predicted maliciousness, a computing entity (e.g., a query engine) associated with the data store is then alerted.

The generation of syntax metrics can be done quickly even for systems that have lower processing capabilities. Furthermore, the detection is done in a way that preserves the privacy associated with the query since the query content itself is not retained even if it is temporarily evaluated. The generation of the syntax metrics may even be done locally within the sphere of trust of the data store, and the syntax metrics then provided for more complex prediction (such as in a cloud computing environment). Thus, the detection and alerting based on syntax metrics may be performed completely securely as a service without divulging the content of the query to the service provider.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the detection and alerting on malicious queries that are directed towards a data store. Furthermore, this detection is done by using syntax metrics of the query. This can be done without evaluating (or at least without retaining) the unmasked query. Accordingly, privacy of the query content itself is preserved. The evaluation and detection of malicious queries can be performed under very strict privacy and performance constraints.

In order to detect a potentially malicious query, one or more syntax metrics of that query are accessed. As an example, such syntax metrics could include a complexity measure of the query, data generated from the compilation or interpretation of the query, string entropy of the query, and/or so forth. The one or more syntax metrics are then fed into a model that is configured to predict maliciousness of the query based on the one or more syntax metrics. The output of the model then represents a prediction of maliciousness of the query. Based on the output of the model representing the predicted maliciousness, a computing entity (e.g., a query engine) associated with the data store is then alerted.

The generation of syntax metrics can be done quickly even for systems that have lower processing capabilities. Furthermore, the detection is done in a way that preserves the privacy associated with the query since the query content itself is not retained even if it is temporarily evaluated. The generation of the syntax metrics may even be done locally within the sphere of trust of the data store, and the syntax metrics then provided for more complex prediction (such as in a cloud computing environment). Thus, the detection and alerting based on syntax metrics may be performed completely securely as a service without divulging the content of the query to the service provider.

Figure 1:
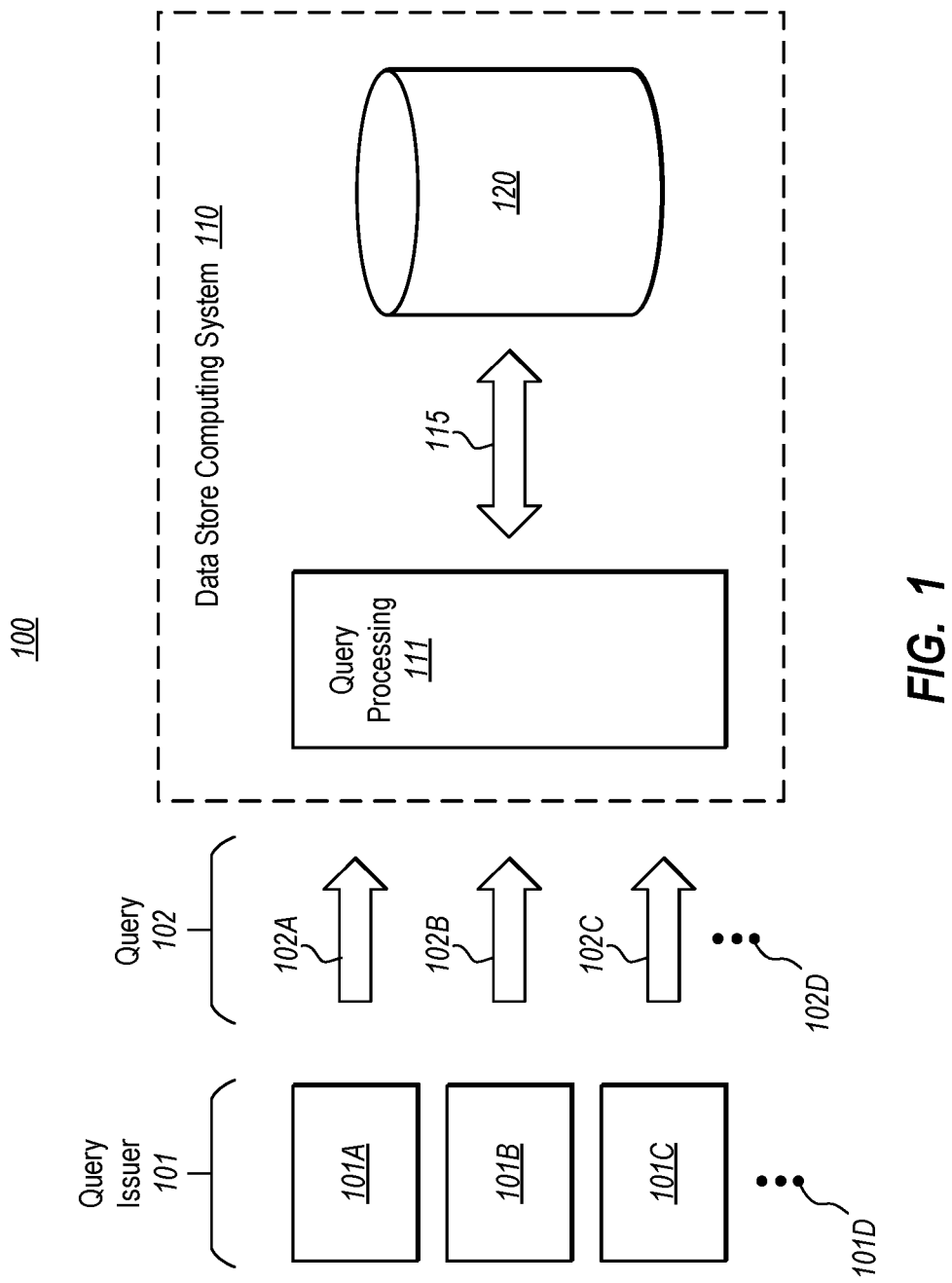
FIG. 1 illustrates an environment in which the principles described herein may be employed, and which includes a data store computing system that processes queries to be executed against a data store.

FIG. 1 illustrates an environment 100 in which the principles described herein may be employed. The environment 100 includes a data store computing system 110 that processes queries to be executed against a data store. In particular, the data store computing system 110 includes a query processing component 111 that receives queries to be processed against a data store 120. The interaction between the query processing component 111 and the data store 120 is represented in FIG. 1 by a bi-directional arrow 115.

As an example, the data store may be a cloud-based data service, a database, a combination of a cloud-based data service and a database, or any other data store. As an example, the data store computing system 110 may be structured as described below for the computing system 600 of FIG. 6. The query processing component 111 may be structured as described below for the executable component 606 of FIG. 6. Query processing components that receive and interpret queries for a data store are often termed a "query engine".

The data store computing system 110 may receive queries from any of multiple possible query issuers 101. In the illustrated case, the query issuers 101 include three possible query issuers 101A, 101B and 101C. However, the ellipsis 101D represents that the data store computing system 110 may receive queries (and thus the query processing component 111 may process queries) from any number of query issuers. In some cases, there may be innumerable numbers of possible query issuers that may issue queries targeted to the data store 120 that are received by the query processing component 110.

As an example, in the illustrated case, the query issuer 101A sends a query 102A to the query processing component 111 of the data store computing system 110. Likewise, the query issuer 101B sends the query 102B and the query issuer 101C sends the query 101C to the data store computing system 110 for processing by the query processing component 111. The queries 102A through 102C may be collectively referred to herein as "queries 102". As represented by the ellipsis 102D, other query issuers (as represented by the ellipsis 101D) may also issue queries to the data store computing system 110. The ellipsis 102D also represents that any of the query issuers may issue any number of queries to the data store computing system 110.

Each query includes instructions to perform operations on the data store 120. As an example, a query may include instructions to read data, edit data, delete data, and so forth. The term "query" is not used herein to imply that the instruction is limited to reading data. However, the term "query" is understood in the art to represent any instruction to be performed against a data store. In some query languages, the query is structured as a string of characters. The query is typically further structured to conform with syntactic rules of a query language. An example query language is the Structured Query Language (SQL). Other query languages include, but are not limited to, Hyper Text Structured Query Language (HTSQL) language, the Muldis Data (Muldis D) language and Multidimensional Expressions (MDX) language, amongst others. The principles described herein are not limited to any particular query language.

Figure 2:
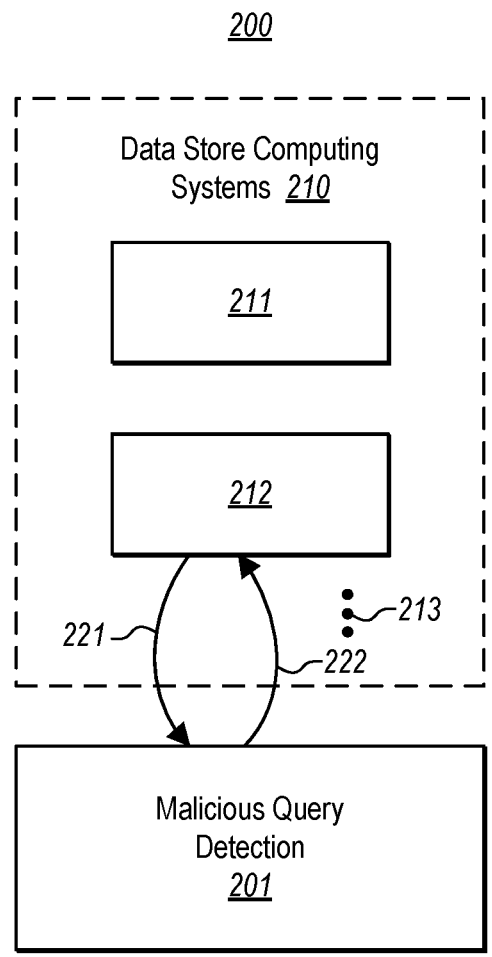
FIG. 2 illustrates a larger environment in which the principles described herein may be employed, and illustrates a malicious query detection component that interfaces with multiple data store computing systems such as the data store computing system of FIG. 1.

FIG. 2 illustrates a larger environment 200 in which the principles described herein may be employed, and illustrates a malicious query detection component 201 that interfaces with multiple data store computing systems 210. In the illustrated embodiment of FIG. 2, the data store computing systems 210 are illustrated as including two data store computing systems 211 and 212. However, as represented by ellipsis 213, malicious query detection component 201 may interface with any number (one or more) of data store computing systems. Each data store computing system 210 may be structured as described for the combination of the data store computing system 110 of FIG. 1. Furthermore, the malicious query detection component 201 may be structured as described below for the executable component 606 of FIG. 6.

Figure 3:
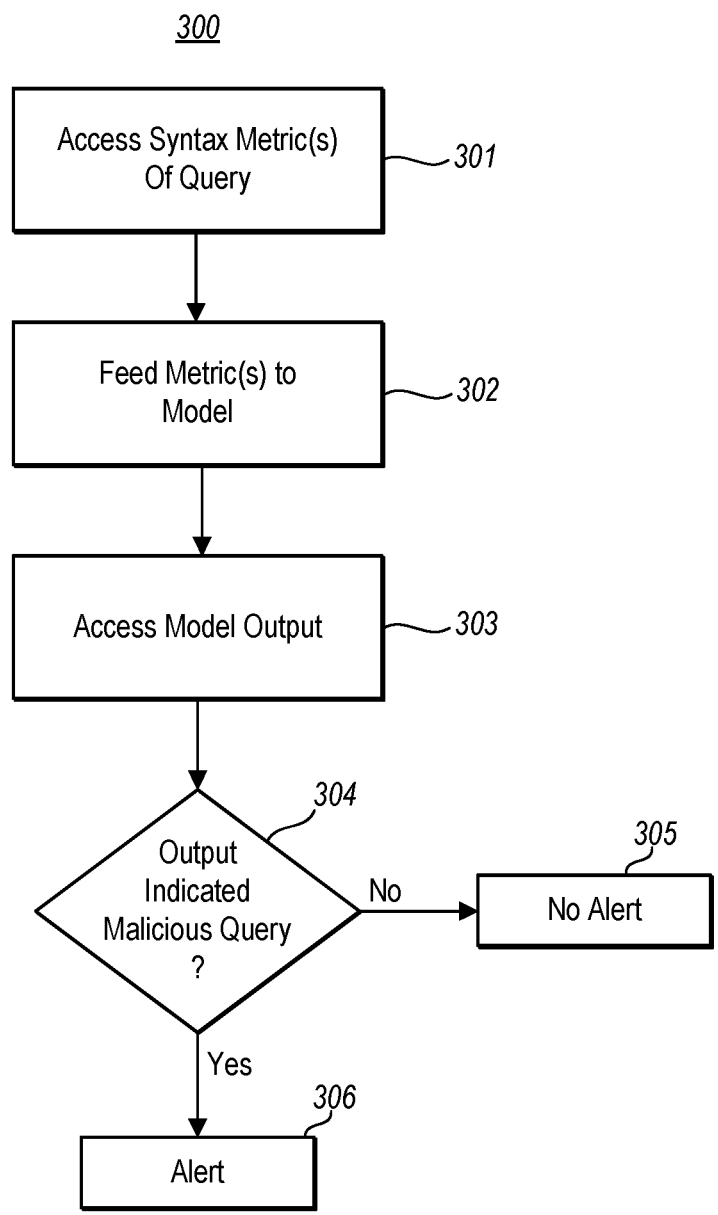
FIG. 3 illustrates a flowchart of a method for detecting and alerting on malicious queries directed towards a data store, in accordance with the principles described herein.
Figure 4:
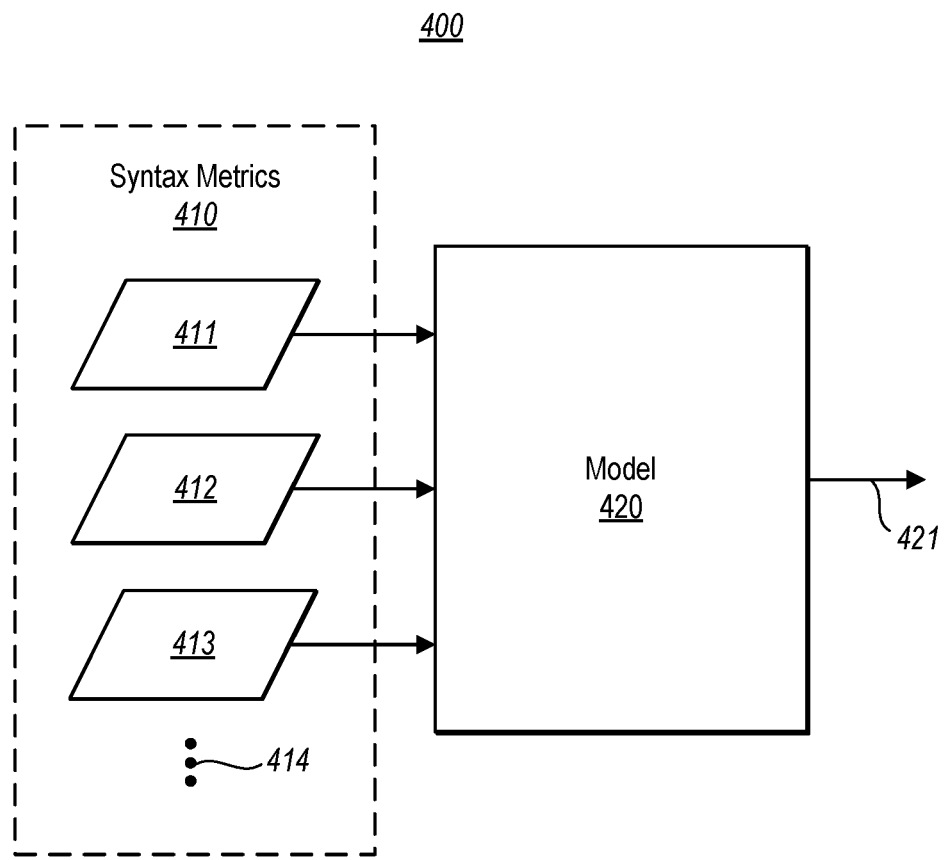
FIG. 4 illustrates example dataflows performed by the malicious query detection component of FIG. 2, and which occur in one example during the performance of the method of FIG. 3.

FIG. 3 illustrates a flowchart of a method 300 for detecting and alerting on malicious queries directed towards a data store, in accordance with the principles described herein. The method 300 may be performed by the malicious query detection component 201 of FIG. 2. FIG. 4 illustrates example dataflows 400 performed by the malicious query detection component 201 of FIG. 2, and which occur in one example during the performance of the method 300 of FIG. 3. Accordingly, the method 300 will now be described with frequent reference to the environment 200 of FIG. 2 and the dataflows 400 of FIG. 4.

The method 300 includes accessing one or more syntax metrics of a query directed towards a data store (act 301). In this description and in the claims, a "syntax metric" of a query is a value that is computed based on the query, and that is deterministically related to the query, but does not contain content of the query itself. In the example dataflow 400 of FIG. 4, an example of such syntax metrics is represented by syntax metrics 410, which may be provided as input to the malicious query detection component 201 of FIG. 2. In the illustrated dataflow 400 of FIG. 4, the syntax metrics 410 include three query metrics 411, 412 and 413. However, the ellipsis 414 represents that the principles described herein may apply for any number (one or more) of syntax metrics of a query.

Returning to FIG. 3, the one or more syntax metrics are then fed into a model (act 302). The model is configured to predict maliciousness of the query based on the one or more syntax metrics. Referring to FIG. 4, the syntax metrics 411, 412 and 413 are shown is being input to the model 420.

Then, the method 300 includes accessing the resulting output of the model (act 303). Referring to FIG. 4, an example of such output is represented by model output 421.

The output represents a predicted maliciousness of the query. In one example, this output could be a binary representation of whether or not the model 420 predicts that the query is malicious. In another example, the output could be represented in the form of levels of predicted maliciousness (e.g., very malicious, somewhat malicious, slightly malicious, and so forth). Alternatively, or in addition, whether the output is a binary prediction of maliciousness, or a prediction of a level of maliciousness, the output could also include a confidence in the prediction (e.g., 80 percent confidence of a prediction of somewhat malicious, or perhaps 60 percent confident that this query is malicious). Alternatively, the prediction could be a score, from which the level or maliciousness and perhaps also confidence can be later calculated.

The method 300 then includes making a determination of maliciousness of the query based on the output of the model (decision block 304). If the determination does not warrant an alert ("No" in decision block 304), then no alert is issued (act 305). On the other hand, if the determination does warrant an alert ("Yes" in decision block 304), then the computing entity associated with the data store to which the query was directed is alerted of the determined maliciousness of the query (act 306). As an example, referring to FIG. 2, suppose that the query whose metric(s) are being evaluated is the data store computing system 212, the malicious query detection component 201 would alert (as represented by arrow 222) the data store computing system 212 of the determined maliciousness of the query.

Accordingly, what is described is the alerting on malicious queries directed towards a data store. This is done by accessing one or more syntax metrics of a query directed towards a data store, feeding the one or more syntax metrics into a model that is configured to predict maliciousness of the query based on the one or more syntax metrics, accessing an output of the model, the output representing a predicted maliciousness of the query; and based on the output of the model representing the predicted maliciousness, alerting a computing entity associated with the data store. Thus, the prediction of maliciousness of a query can be done without actually evaluating, or at least not retaining, the query itself.

Accordingly, because parameters of a query may themselves contain proprietary information, the security of the query issuer and/or data store computing system is preserved. Notwithstanding, the maliciousness of the query was predicted based on one or more metrics of a query. When such metrics are chosen to have higher correlation with potential maliciousness, then such predictions can be highly accurate. Even if they are not quite as accurate, the data store computing system can be notified of any query that is potentially malicious, allowing the data store computing system to perform a targeted analysis of the unmasked query. This saves the data store computing system time and computing resources as compared to evaluating all of the queries.

As previously mentioned, it is helpful if the metrics of the query have a correlation with potential maliciousness. Several metrics will now be described which do have potential correlation with maliciousness. One such metric is a complexity measure of the query. More complex queries may correlate to a greater likelihood that the query is malicious. In particular, a Halstead complexity measure defines code (or query) complexity as a function of a number of its total or distinct operators (commands) and operands (parameters). Suspicious queries might differ in code density metric (contain more operators than parameters) due to attempts to manipulate query logic (and not fine-tune the query logic).

Another example of such a metric is a data structure generated by the compilation or interpretation of the query. In the process of compilation or interpretation of code (a script or a query), there are pre-processing and optimization stages that shed light on the complexity and structure of the object. For example, metadata of steps like tokenization and constant propagation can indicate a pattern of code logic, which is dynamically built. An example of such dynamically build code logic patterns that might indicate obfuscation attempts are SQL reserved words that are constructed only during interpretation but are based on constant logic.

Yet another example of such a metric is string entropy of all or a portion of the query. String entropy measures the character randomness present in the query. For example, a query that contains hashes or random non-alphanumeric characters might indicate attempts to escape the query (e.g. SQLi), pass dynamic parameters (e.g. randomly generated C&C sites), and so forth.

Accordingly, the use of any one of these metrics provides a good ability to predict potential maliciousness of a query. The use of multiple of such metrics allows for the multivariate representation of various query aspects, without looking at the queries exact content. Such a multivariate representation allows for more refined and accurate predictions of the maliciousness.

In one example, the malicious query detection component does not even look at the query at all. Instead, the data store computing system generates the metric(s) of the query itself, and provides the metric(s) to the malicious query detection component. This providing may be represented by the arrow 221 of FIG. 2. In such a case, the dataflows 500 of FIG. 5 may be performed within the data store computing system itself (e.g., within the data store computing system 212 of FIG. 2). As an example, in such a case, the data store computing system has a generation component 502 that generates the syntax metrics 410 using the query 501 itself.

This mechanism has the benefit that the malicious query detection component does not even see the query, and thus the security of any proprietary information that is contained within the query is preserved. Furthermore, the metrics such as those described above can be generated with little processing power, and thus the metric(s) may be generated on a single machine, such as a query server, with minimal impact on processor resources.

In another example, the malicious query detection component does look at the query, but only for purposes of generating the metrics, and the query is not retained. In such a case, the dataflows 500 of FIG. 5 may be performed within the malicious query detection component 201. If the malicious query detection component 201 is implemented within a cloud computing environment, the metrics can quickly be calculated due to the relatively large amount of processing resources available in a cloud computing environment.

Figure 5:
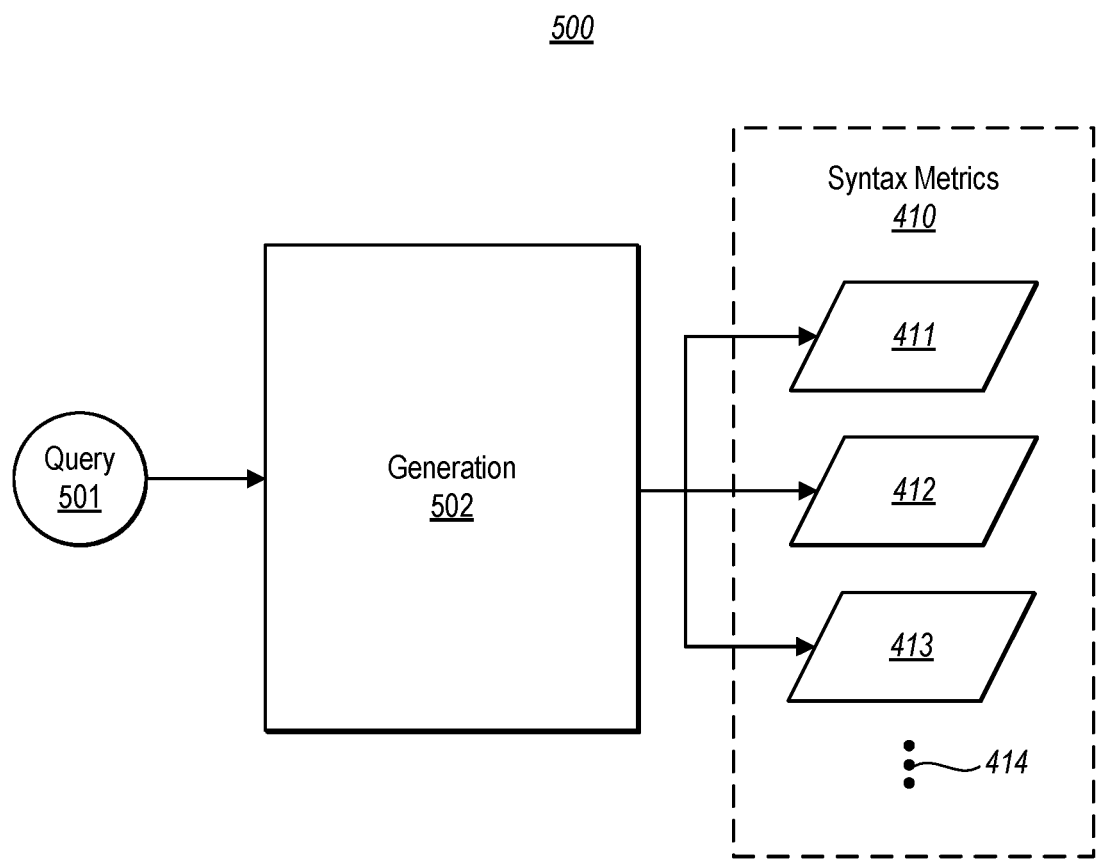
FIG. 5 illustrates example dataflows involved with the generation of syntax metrics of a query.

In one example, the model 420 of FIG. 5 is an unsupervised model, and the output 421 represents a predicted maliciousness based on anomaly detection or classification performed by the unsupervised model. The use of such an unsupervised model is that it can perform predictions without having to train the model. Instead, each query is mapped into a point within an embedding space, and anomaly detection and classification can then be used to perform predictions based on clustering of the points within the embedding space.

In another example, the model 502 of FIG. 5 is a trained machine learning model. This allows the trainer of the model 502 to be in control of the types of queries that the model is most suited to perform predictions on (that data that most closely aligns with the training data). In this case, the metrics will be fed into the model in training, and then the resulting prediction compared against the label indicating maliciousness. Based on the correctness or incorrectness of the prediction, the model is adjusted.

In yet another example, the model 502 of FIG. 5 is configured to predict maliciousness by applying one or more rules to the one or more syntax metric(s). The application of rules is much faster than say applying input data into a neural network. Furthermore, the circuitry and architecture used for application of rules is typically simpler than the circuitry and architecture employed by machine learning models.

The method 300 may be repeated for each query that is to be analyzed. As an example, the method 300 may be performed for different queries from the same data store computing system, or from different queries from different data store computing systems. The method 300 may be performed even countless times to provide malicious query detection service for many queries and for many data store computing systems.

Accordingly, the principles described herein provide an effective way to alert on the presence of possible malicious queries while preserving the proprietary nature that content of the query can sometimes have. Because the principles described herein are performed in the context of a computing system, some introductory discussion of a computing system will be described with respect to FIG. 6. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
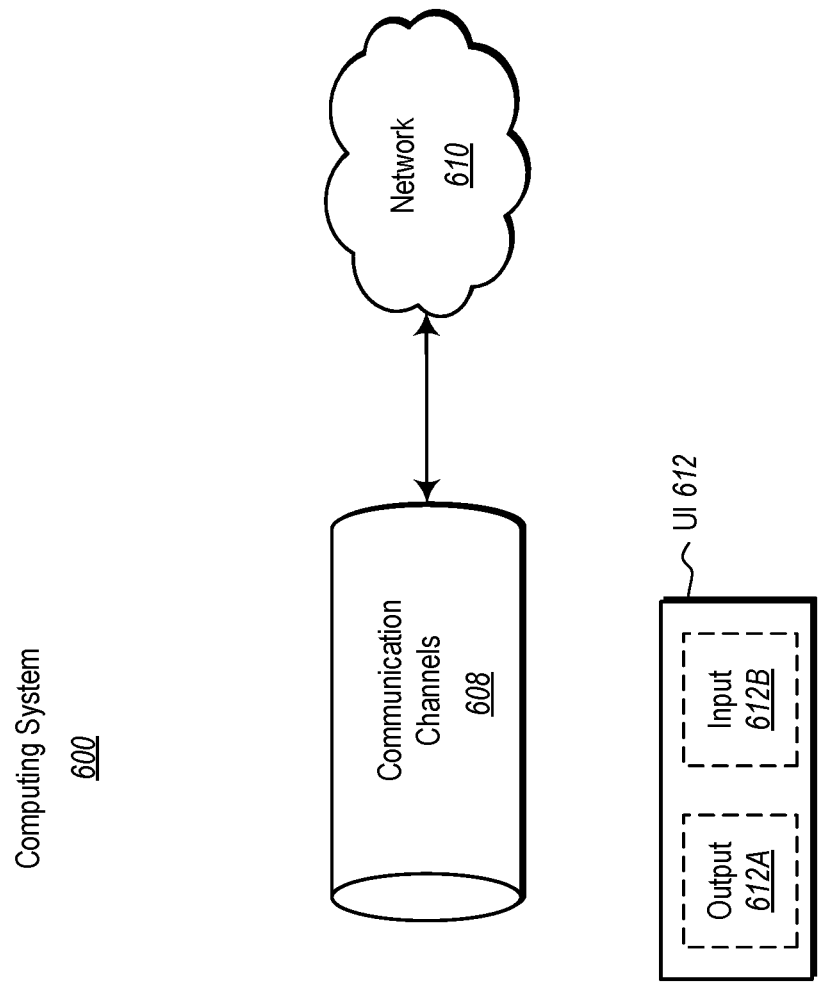
FIG. 6 illustrates an example computing system in which the principles described herein may be employed.
Figure 6:
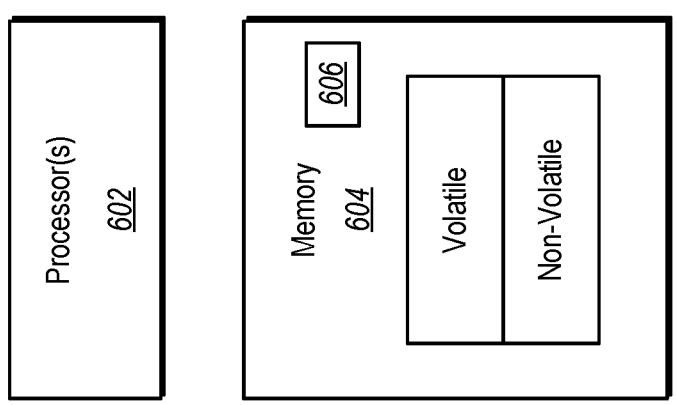

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that detects malicious queries directed towards a data store, said computing system comprising:
   one or more processors; and
   one or more hardware storage devices that store instructions that are executable by the one or more processors to cause the computing system to:
   access one or more syntax metrics of a query directed towards a data store, wherein the one or more syntax metrics include a complexity measure of the query, the complexity measure defining a complexity of the query as a function of a number of commands and a number of parameters in the query;

feed the one or more syntax metrics into a model that is configured to predict maliciousness of the query based on the one or more syntax metrics, wherein predicting the maliciousness based on the one or more syntax metrics includes predicting the maliciousness based on a code density between the number of commands and the number of parameters in the query;

access an output of the model, the output representing a predicted maliciousness of the query; and based on the output of the model representing the predicted maliciousness, alert a computing entity associated with the data store.

2. The computing system in accordance with claim 1, wherein accessing the one or more syntax metrics of the query comprises generating the one or more syntax metrics without retaining or evaluating unmasked content of the query.

3. The computing system in accordance with claim 1, wherein accessing the one or more syntax metrics comprises receiving the one or more syntax metrics from a computing entity associated with the data store, the computing entity having previously generated the one or more metrics of the query.

4. The computing system in accordance with claim 1, the model being an unsupervised model, the output representing a predicted maliciousness based on anomaly detection or classification performed by the unsupervised model.

5. The computing system in accordance with claim 1, the model being a trained machine learning model.

6. The computing system in accordance with claim 1, the model configured to being configured to predict maliciousness by applying one or more rules to the one or more syntax metrics.

7. The computing system in accordance with claim 1, the one or more syntax metrics being a plurality of syntax metrics.

8. The computing system in accordance with claim 7, wherein the plurality of syntax metrics include data generated by the compilation or interpretation of the query and a string entropy of all or a portion of the query.

9. A method for detecting and alerting on malicious queries directed towards a data store, the method comprising:

accessing one or more syntax metrics of a query directed towards a data store, wherein the one or more syntax metrics include a complexity measure of the query, the complexity measure defining a complexity of the query as a function of a number of commands and a number of parameters in the query;

feeding the one or more syntax metrics into a model that is configured to predict maliciousness of the query based on the one or more syntax metrics, wherein predicting the maliciousness based on the one or more syntax metrics includes predicting the maliciousness based on a code density between the number of commands and the number of parameters in the query;

accessing an output of the model, the output representing a predicted maliciousness of the query; and based on the output of the model representing the predicted maliciousness, alerting a computing entity associated with the data store.

10. The method in accordance with claim 9, the accessing of the one or more syntax metrics of the query comprising: generating the one or more syntax metrics of the query without retaining or evaluating unmasked content of the query.

11. The method in accordance with claim 9, the accessing of the one or more syntax metrics comprising:

receiving the one or more syntax metrics from the computing entity associated with the data store, the computing entity having previously generated the one or more metrics of the query.

12. The method in accordance with claim 9, the model being an unsupervised model, the output representing a predicted maliciousness based on anomaly detection or classification performed by the unsupervised model.

13. The method in accordance with claim 9, the model being a trained machine learning model.

14. The method in accordance with claim 9, the model configured to being configured to predict maliciousness by applying one or more rules to the one or more syntax metrics.

15. The method in accordance with claim 9, the one or more syntax metrics being a plurality of syntax metrics.

16. The method in accordance with claim 9, wherein the query is determined to be relatively more suspicious when the code density indicates that the number of commands is higher than the number of parameters in the query.

17. The method in accordance with claim 9, the one or more syntax metrics being data generated by the compilation or interpretation of the query.

18. The method in accordance with claim 9, the one or more syntax metrics being a string entropy of all or a portion of the query.

19. The method in accordance with claim 9, the query being a first query directed towards the data store, the one or more metrics of the syntax query being first one or more metrics, the output of the model being first output of the model, the method further comprising:

accessing second one or more syntax metrics of a second query directed towards the data store;

feeding the second one or more syntax metrics into the model;

accessing a second output of the model, the second output representing a predicted maliciousness of the second query; and based on the second output of the model representing the predicted maliciousness of the second query, alerting the computing entity associated with the data store.

20. One or more hardware storage devices that store instructions that are executable by one or more processors to cause the one or more processors to:

access one or more syntax metrics of a query directed towards a data store, wherein the one or more syntax metrics include a complexity measure of the query, the complexity measure defining a complexity of the query as a function of a number of commands and a number of parameters in the query;

feed the one or more syntax metrics into a model that is configured to predict maliciousness of the query based on the one or more syntax metrics, wherein predicting the maliciousness based on the one or more syntax metrics includes predicting the maliciousness based on a code density between the number of commands and the number of parameters in the query;

access an output of the model, the output representing a predicted maliciousness of the query; and based on the output of the model representing the predicted maliciousness, alert a computing entity associated with the data store.

\* \* \* \* \*